United States Patent [19]

Lee

[11] Patent Number: 5,665,828
[45] Date of Patent: Sep. 9, 1997

[54] ACRYL-FUNCTIONAL POLYBUTYLENE

[75] Inventor: Kenneth Michael Lee, Bay City, Mich.

[73] Assignee: Dow Corning Corporation, Midland, Mich.

[21] Appl. No.: 741,988

[22] Filed: Oct. 31, 1996

[51] Int. Cl.[6] .................................................. C08F 267/04
[52] U.S. Cl. ............................................................. 525/285
[58] Field of Search ............................................. 525/285

[56] References Cited

U.S. PATENT DOCUMENTS

| | | | |
|---|---|---|---|
| 2,835,656 | 5/1958 | Unruh et al. | 525/285 |
| 2,973,344 | 2/1961 | Fasce | 525/285 |
| 3,433,777 | 3/1969 | Brunson | 525/285 |
| 3,607,973 | 9/1971 | Holicky et al. | 525/285 |
| 3,840,390 | 10/1974 | Kozu et al. | 525/285 |
| 3,892,717 | 7/1975 | Mori et al. | 525/285 |
| 4,665,127 | 5/1987 | Hirose | 525/100 |
| 4,808,664 | 2/1989 | Saam | 525/106 |
| 4,900,772 | 2/1990 | Imanaka | 524/303 |
| 4,904,732 | 2/1990 | Iwahara | 525/100 |
| 5,492,976 | 2/1996 | Shalati et al. | 525/285 |

FOREIGN PATENT DOCUMENTS

| | | |
|---|---|---|
| 59-6219 | 1/1984 | Japan . |
| 63-199277 | 8/1988 | Japan . |
| 7-102017 | 4/1995 | Japan . |
| 1490240 | 10/1977 | United Kingdom . |

*Primary Examiner*—Bernard Lipman
*Attorney, Agent, or Firm*—Alexander Weitz

[57] ABSTRACT

The invention relates to a polybutylene polymer or oligomer which contains in its molecule at least one acryl group, said polybutylene being prepared by reacting (A) an anhydride-functional polybutylene, or derivative thereof, with (B) an acryl-functional compound having at least one hydroxyl-containing group, chlorine, isocyanate group, epoxy group or amine group in its molecule.

18 Claims, No Drawings

ACRYL-FUNCTIONAL POLYBUTYLENE

FIELD OF THE INVENTION

The present invention relates to a functional polybutylenes which contain at least one reactive acryl group. More particularly, the invention relates to a polybutylene prepared by reacting an anhydride-functional polybutylene, or derivative thereof, with an acryl-functional compound which also has at least one hydroxyl-containing group, chlorine, isocyanate group, epoxy group or amine group in its molecule.

BACKGROUND OF THE INVENTION

Hydrocarbon polymers which contain reactive functional groups are known in the art. For example, Japanese (Kokai) 7-102017 to Kanegafuchi Chemical Industry discloses the preparation of various polymers having terminal unsaturation by reacting the corresponding hydroxyl-terminated polymer with a compound selected from an allyl halide, an acrylic acid, an oxirane ring-containing compound having carbon-carbon double bonds or a compound containing an isocyanate group and carbon-carbon double bonds in its molecule. The starting polymer, which must contain at least 1.1 hydroxyl groups per molecule, can be prepared by carrying out a chain scission of the hydrocarbon polymer chain by reacting it with ozone, followed by reduction with lithium aluminum hydride. This method for producing the hydroxy-functional precursor polymer has a disadvantage in that the chain scission results in a reduction of polymer molecular weight, as observed in Reference Example 1 of the above mentioned Kanegafuchi publication.

Further, polyisobutylenes and polybutylenes which have 2-methyl-1-propenyl end groups of the formula $-HC=C(CH_3)_2$ are available commercially. However, this type of unsaturation exhibits poor reactivity with SiH-functional silanes and siloxanes. A lack of reactivity is also observed in attempts at copolymerization with other olefin-based systems such as polyacrylics and polystyrenics. Additionally, these unreactive olefinic polyisobutylenes can not effectively be used to modify systems cured by conventional free radical means such as ultraviolet (u.v.) light and peroxides.

There is, therefore, a need for easily prepared polyisobutylene polymers and oligomers which contain unsaturated groups having improved reactivity with SiH-functional compound, better reactivity with olefin-based polymerization systems and which exhibit an improved efficiency with respect to free radical cure mechanisms, as desirable in such applications as protective coatings.

SUMMARY OF THE INVENTION

It has now been discovered that an anhydride functional polybutylene, or simple derivative thereof, can be reacted with certain acryl-functional compounds to form polybutylenes which contain an unsaturated group having improved reactivity with SiH-functional materials as well as a much broader range of reactivity with respect to copolymerization with olefinic monomers and with respect to Michael additions with amines, thiols and alcohols.

The present invention, therefore, relates to a functionalized polybutylene polymer or oligomer which contains at least one acryl group in its molecule, said functionalized polybutylene being prepared by reacting (A) an anhydride-functional polybutylene (or a diacid or ester derivative thereof) with (B) an acryl-functional compound which also contains at least one hydroxyl-containing group, chlorine, isocyanate group, epoxy group or amine group in its molecule.

DETAILED DESCRIPTION OF THE INVENTION

According to the present invention, the functionalized polybutylene is prepared from an anhydride-functional polybutylene (A) (or a diacid or ester derivative thereof). For the purposes of the invention, component (A) is a polybutylene (PB) polymer or oligomer having at least one anhydride-containing group along its chain or at its end(s). A preferred anhydride-functional PB contains one anhydride group per molecule and has the formula

wherein Z represents a polymer (or oligomer) chain consisting essentially of butylene repeat units. The polybutylene chain can comprise repeat units having the following formulas

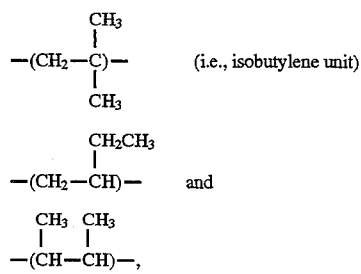

as well as rearranged products such as

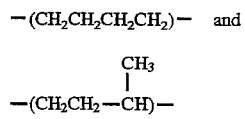

The preferred component (A) is an oligomer or polymer wherein a predominant proportion of the repeat units are isobutylene units and which has a number average molecular weight of about 200 to 200,000, preferably about 200 to 2,000.

Polybutylene (A) is known in the art and may be prepared, e.g., by heating an unsaturated PB with maleic anhydride. The above mentioned unsaturated PB is available commercially in a variety of molecular weights from, e.g., the Amoco Chemical Company (Chicago, Ill.) under the trade name Indopol™, from BASF Aktiengesellschaft (Germany) under the trade name Glissopal™ and from BP Chemicals Ltd. (London) under the trade name Ultravis™. In general, when the unsaturated PB is reacted with maleic anhydride, a portion (e.g., 30% or less) of the polymer remains unfunctionalized with anhydride, such incompletely functionalized products being suitable for applications contemplated herein. Efforts to reduce the unfunctionalized polymer content have been the object of process improvement patents, such as U.S. Pat. No. 4,110,349 to Cohen, which teaches the use of chlorine to increase conversion. It is preferred that each molecule of component (A) contains at least one anhydride group.

In a first embodiment of the present invention, one acryl group is attached to each PB through an ester linkage. In this case, component (B) is an acryl-functional organic compound which also has at least one hydroxyl-containing organic group in its molecule. The hydroxyl group of (B)

reacts with the anhydride of component (A) to form the ester linkage between PB and the acryl group. As used herein, the term "acryl" denotes a generic group having the formula

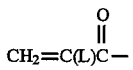 (ii)

wherein L is selected from the group consisting of hydrogen and an alkyl radical having 1 to 18 carbon atoms. Thus, for example, this acryl group can be an acrylic or methacrylic group wherein L is H or methyl, respectively. Alternatively, the acryl group can be linked to the PB through a nitrogen atom to form an acrylamide structure of the type

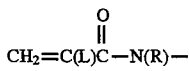

wherein L is as defined above and R is hydrogen or an alkyl radical having 1 to 10 carbon atoms.

Preferably, the acryl group in this, as well as the other embodiments recited infra, is either acrylic or methacrylic. This acryl group is attached to a hydroxyl group through an organic connecting group which provides a separation of at least one carbon atom between the hydroxyl group and the above described acryl group. The nature of the connecting group is otherwise not critical to the invention provided that it does not interfere with the reaction of the anhydride functionality of component (A) with the hydroxyl functionality of component (B) and that it is chemically inert with respect to the acryl functionality of (B). Preferably, the acryl-functional component (B) has the formula HO—G—OC(O)C(L)=CH$_2$ (iii)

wherein G is an alkylene group having 2 to 10 carbon atoms, such as —CH$_2$CH$_2$—, —CH$_2$CH$_2$CH$_2$—, —CH$_2$CH(CH$_3$)CH$_2$— and —CH$_2$CH$_2$CH$_2$CH$_2$— and L is as defined above. Particularly preferred acryl-functional component (B) is selected from the group consisting of hydroxyethylacrylate, hydroxypropylacrylate, hydroxybutylacrylate and hydroxypropylmethacrylate.

According to the first embodiment of the present invention, about one equivalent of component (A) may be reacted with one equivalent of component (B) to produce an acryl-functional polybutylene having an ester connecting group disposed between the polybutylene chain and the acryl group. The remaining functionality resulting from the reaction is a carboxylic acid group such that this product may be called a half ester, half acid. This reaction is quite facile at temperatures of about 70° to 150° C., preferably 80° to 100° C., and may be carried out by heating a mixture of the neat components or heating a solution of these components in an organic solvent such as toluene or hexane in order to improve compatibility therebetween. Typically, a small quantity of a tertiary amine such as pyridine is also added to promote the reaction between the hydroxyl group of component (B) and the anhydride group of component (A). For example, when component (B) is represented by formula (iii) and the anhydride-functional PB is represented by formula (i), the product resulting from the above reaction may be represented by formulas (iv) and (v)

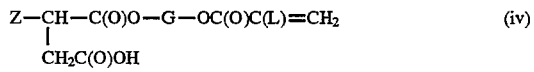 (iv)

and

 (v)

wherein Z, G and L are as defined above. Those skilled in the art will, of course, recognize that a mixture of the above two products is obtained since the hydroxyl group of component (B) attacks alternative sides of the anhydride ring of component (A). Further, although formulas (iv) and (v), as well as other structures shown infra, illustrate polybutylenes of the invention having only one functional end group, it is also contemplated herein that these groups (i.e., the groups shown attached to Z— in the above formulas) can reside at each end of a polybutylene chain or along the chain.

In a second embodiment of the present invention, the anhydride-functional group may be modified so as to incorporate two acryl groups. For example, the above half ester, half acid products of formulas (iv) and (v) can first be reacted with an equivalent amount of a base such as sodium hydroxide, potassium hydroxide, potassium carbonate or a tertiary amine to prepare carboxylate salts having the following structures

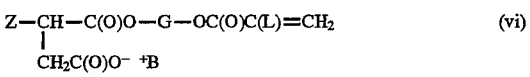 (vi)

and

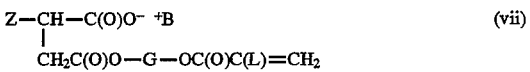 (vii)

wherein Z, G and L are as defined above and B is the residue from the base B. The above reaction can be performed by mixing the components at room temperature with an organic base. With an inorganic base, such as potassium carbonate, addition of solvent and a small quantity of water and heating to about 40° to 50° C. is preferred. These salts are then reacted at room temperature with an acryl chloride, such as Cl—C(O)C(L)=CH$_2$, wherein L is as defined above, to produce the desired product having two acryl groups:

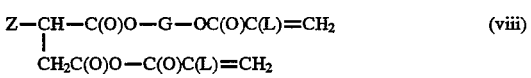 (viii)

and

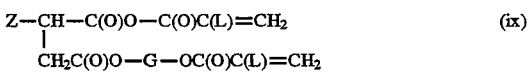 (ix)

wherein Z, G and L are as defined above (L may be the same or different in the above formulas).

In a variation of the second embodiment of the present invention, anhydride-functional polybutylene (A) can first be reacted with water to provide a dicarboxylic acid-functional PB of the formula

 (x)

wherein Z is as defined above. This dicarboxylic acid-functional PB is then reacted with two equivalents of the above mentioned acryl chloride to produced a structure such

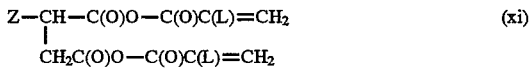 (xi)

wherein Z and L are as defined above (L may be the same or different in the above formulas) or a similar structure wherein only one of the carboxyl groups is reacted.

In yet another variation of the second embodiment, the anhydride-functional group may be modified so as to incorporate one acryl group by first reacting one equivalent of component (A) with about one equivalent of an alcohol at elevated temperature (e.g., 90° C.), the reaction preferably being carried out in a solvent such as toluene. The alcohol is preferably selected from methyl, ethyl or propyl alcohol. This reaction results in a mixture of half ester, half acid structures and is illustrated by the following formulas for the case wherein the alcohol used is ethanol

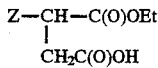 (xii)

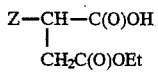 (xiii)

wherein Z is as defined above and Et represents ethyl radical. The half acid, half ester adduct is then reacted with the above mentioned acryl chloride in the presence of a base, as described above, to provide acryl-functional PB having the following structures (illustrated for the case of the above half ethyl ester, half acid mixture)

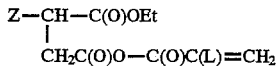 (xiv)

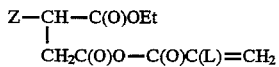 (xv)

wherein Z, L and Et are as defined above.

In a third embodiment of the present invention, the anhydride-functional group may be modified so as to incorporate one or two acryl groups. For example, the half ester, half acid structures, such as those illustrated by formulas (iv) and (v), can be reacted with a compound having both isocyanate functionality as well as acryl functionality. Preferred compounds of this type include the following structures

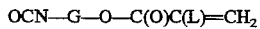

and

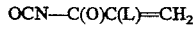

wherein G and L are as defined above. Preferably, the isocyanate-functional acryl compound is

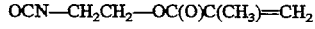

This reaction can be carried out by mixing the above components at room temperature. When materials of the formula (iv) or (v) are reacted with the above preferred isocyanate-functional compound, the products have the formulas

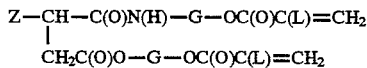 (xvi)

and

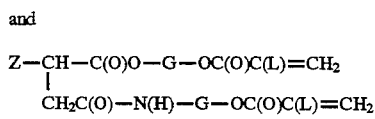 (xvii)

wherein Z, G and L are as defined above (G and L may be the same or different within each formula). Those skilled in the art will appreciate that other similar structures can be prepared according to this embodiment by reacting the above isocyanate compounds with compounds of the type shown in formulas (x), (xii) and (xiii).

In a fourth embodiment of the present invention, the anhydride-functional group may also be modified so as to incorporate one or two acryl groups. In this case, the half ester, half acid structures, such as those illustrated by formulas (iv) and (v), are reacted with an epoxy-functional acryl compound of the formula

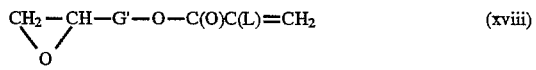 (xviii)

wherein L is as defined above and G' is an alkylene group containing 1 to 10 carbon atoms. Preferably, the compound of formula (xviii) is selected from the group consisting of glycidylmethacrylate and glycidylacrylate. This reaction can be carried out by heating a mixture of the components at 60° to 120° C. and results in products having the formulas

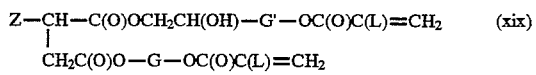 (xix)

and

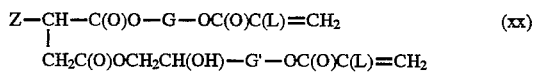 (xx)

wherein Z, G' and L are as defined above (L may be the same or different in each formula).

In a variation of the fourth embodiment, two acryl groups may be attached by reacting two equivalents of the epoxy compound (xviii) with one equivalent of the dicarboxylic acid shown in formula (x). Likewise, one acryl group may be attached by reacting the epoxy compound (xviii) with half ester, half acids of the type shown in formulas (xii) and (xiii).

In a fifth embodiment of the present invention, the anhydride-functional group may again be modified so as to incorporate one or two acryl groups. For example, the half ester, half acid structures, such as those illustrated by formulas (iv) and (v), can be reacted with an amine-functional acryl compound of the formula

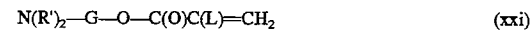 (xxi)

wherein G and L are as defined above and R' is independently selected from alkyl radicals having 1 to 6 carbon atoms. Preferably, the compound of formula (xxi) is selected from the group consisting of dimethylaminoethylacrylate and dimethylaminoethylmethacrylate.

This reaction can be carried out by mixing the above components at room temperature to form products having the formulas

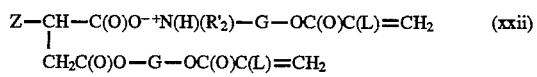 (xxii)

and

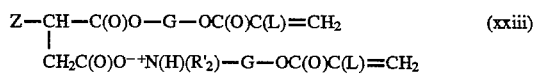 (xxiii)

wherein Z, G, R' and L are as defined above (L may be the same or different in the above formulas). Again, those skilled in the art will appreciate that other similar structures can be prepared according to this embodiment by reacting the above aminoalkyl acryl compounds with compounds such as those shown in formulas (x), (xii) and (xiii).

The above mentioned acryl-functional compounds of embodiments 1 through 5 are well known in the art and further description thereof is not considered necessary herein.

The polybutylenes containing reactive acryl groups according to the invention find utility as intermediates for the preparation of protective coatings and copolymers, as co-reactants for various free radical systems and as modifiers for siloxane polymeric systems (e.g., for the control of modulus or barrier properties).

EXAMPLES

The following examples are presented to further illustrate the compositions of the invention, but are not to be construed as limiting the invention, which is delineated in the appended claims. All parts and percentages in the examples are on a weight basis and all measurements were obtained at 21° C., unless indicated to the contrary.

Example 1

Anhydride-functional polybutylene (NBP 1050) was obtained from Nelson Brothers Corp. (Birmingham, Ala.). This polymer is described as a polyisobutylene in which approximately 70% of the chains have been modified by incorporation of an anhydride group of the formula

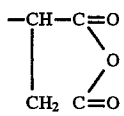

This anhydride-functional PB has a number average molecular weight of about 1,100 and an acid number of about 51–53. The above anhydride-functional PB (109.2 g; 0.095 mole anhydride) was mixed with 11.0 g ( 0.095 mole) of hydroxyethylacrylate and 2 drops of pyridine. This mixture was heated at 83°–94° C. for about 8 hours. IR analysis in the carbonyl region indicated the disappearance of anhydride (1863, 1786 $cm^{-1}$) and the appearance of COOH (1712 $cm^{-1}$) and a new ester peak (1736 $cm^{-1}$); initial olefin functionality (1637 and 1619 $cm^{-1}$) remained intact throughout the reaction. These observations are consistent with the formation of a half acid, half acryloxyethyl ester product of the type shown in above recited structures (iv) and (v), wherein G is —$CH_2CH_2$— and L is hydrogen.

The above product was mixed with 4% (based on total weight) of Darocur™ 1173 (2-hydroxy-2-methyl-1-phenyl-propan-1-one from EM Chemicals, Hawthorne, N.Y.) coated onto a polyester substrate and exposed to 2100 millijoules of multifrequency UV radiation using a medium pressure mercury vapor lamp. This resulted in a weak film. However, when this procedure was repeated using a mixture of 80% acryl-functional polyisobutylene and 20% hexanediol diacrylate, a much stronger film resulted. This example demonstrates the reactivity (and co-reactivity) of the unsaturated group-containing polybutylenes of the invention in photochemically initiated reactions.

Example 2

The anhydride-functional polybutylene used in Example 1 (200.1 g; 0.18 mole) was dissolved in 200 ml of toluene containing 20 ml of ethanol and the solution was heated at 0° C. for 2 hours. Analysis by I.R. in the carbonyl region indicated disappearance of the anhydride absorbances (1863 and 1786 $cm^{-1}$) and appearance of COOH at 1710 $cm^{-1}$ and COEt at 1740 $cm^{-1}$ (Et=ethyl), consistent with the formation of a half acid, half ester structure of the type shown in formulas (xi) and (xii), supra.

The above prepared half ethyl ester, half acid intermediate (1.14 g; 0.001 mole was mixed with pyridine (0.08 g; 0.001 mole) and methacryloyl chloride (0.0104 g; 0.001 mole). A white solid formed immediately. Infrared analysis indicated that olefin absorbance at 1635 $cm^{-1}$ remained throughout while the disappearance of COOH (1710 $cm^{-1}$) and the formation of anhydride at 1807 $cm^{-1}$ was consistent with the structures shown in formulas (xiv) and (xv), supra, wherein L is methyl radical.

Example 3

The anhydride-functional polybutylene used in Example 1 (58.7 g; 0.054 mole) and 100 cc of distilled water were heated at 100° C. and stirred for 1.5 hours. Excess liquid water was decanted and 100 cc of hexane was added to the pot, whereupon residual water was removed by azeotropic distillation. When visible water droplets were no longer distilling overhead, hexane was removed under vacuum to a final condition of 80° C. at 1 mm of Hg. Isolated was 59.1 g of an intermediate having a refractive index of 1.4868. Analysis by infrared revealed that the anhydride absorbances at 1863 and 1786 $cm^{-1}$ had disappeared while a COOH peak at 1715 $cm^{-1}$ had appeared, consistent with a dicarboxylic acid-functional PB structure shown in formula (x).

The above prepared dicarboxylic acid-functional PB (1.11 g; 0.001 mole) was mixed with pyridine (0.16 g; 0.002 mole) and methacryloyl chloride (0.208 g; 0.002 mole). A white precipitate formed immediately. Analysis by infrared indicated the disappearance of COOH (1715 $cm^{-1}$ ) and the appearance of strong dianhydride absorptions at 1864 and 1789 $cm^{-1}$. Olefinic absorption at 1634 $cm^{-1}$ persisted. This analysis is consistent with the structure

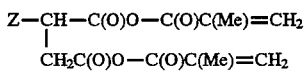

wherein Me and Z hereafter represents methyl radical and the residue of the polyisobutylene chain, respectively.

Example 4

Dicarboxylic acid-functional PB, as prepared in Example 3 (5.58 g; 0.005 mole) and glycidyl methacrylate (1.38 g; 0.0098 mole) were combined and heated at 80° C. for 3 hours. During this time, the mixture became homogeneous. Analysis by infrared indicated a loss of COOK (1714 $cm^{-1}$), the formation of a strong ester peak at 1737 $cm^{-1}$ and the appearance of COH absorptions at about 3430 $cm^{-1}$. The olefin absorbance at 1639 $cm^{-1}$ remained unchanged and the resulting material was consistent with the structure

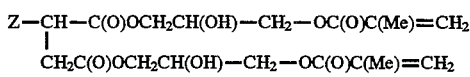

Example 5

A half acid, half acryloxyethyl ester product, such as that prepared in Example 1 (1.50 g; 0.00125 mole), and dimethylaminoethyl methacrylate (0.2 g; 0.00125 mole) were reacted at room temperature. Analysis by infrared indicated a disappearance of COOH (1709 $cm^{-1}$) and the appearance of carboxylate salt absorbance at 1557 $cm^{-1}$. Olefin absorbances at 1639 $cm^{-1}$ remained. The product had a structure consistent with formulas

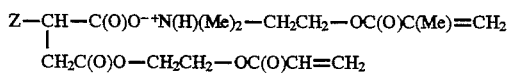

and

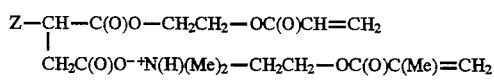

Example 6

The anhydride-functional polybutylene used in Example 1 (1.0 g; 0.01 mole) was mixed with hydroxypropyl-methacrylate (1.44g; 0.0095 mole) and four drops of pyridine. This mixture was heated at 85° C. for ten hours. Analysis by infrared indicated the disappearance of anhydride at 1863 and 1786 $cm^{-1}$ and the loss of COH at about 3445 $cm^{-1}$ the appearance of ester at 1740 $cm^{-1}$ and unchanged olefin at 1739 $cm^{-1}$ was consistent with the structures shown in formulas (iv) and (v), wherein G is —$C_3H_6$— and L is methyl.

Example 7

A half acryloxyethyl ester, half acid, such as prepared in Example 1 (3.43g; 0.003 mole), and glycidyl methacrylate (0.41g; 0.003 mole) were mixed and heated at 80° C. for 2 hours. Infrared analysis indicated new ester absorptions at 1738 $cm^{-1}$ appearance of COH at about 3445 $cm^{-1}$, consistent with the structures

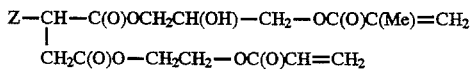

and

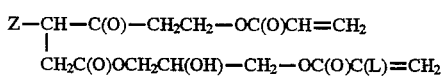

Example 8

A half acryloxyethyl ester, half acid, such as prepared in Example 1 (2.43 g; 0.002 mole), was mixed with pyridine (0.165 g; 0.002 mole) and methacryloyl chloride (0.208 g; 0.002 mole). A white precipitate formed immediately and a slight warming occurred. Analysis by infrared indicated a disappearance of COOH at 1710 $cm^{-1}$ and the appearance of anhydride absorptions at 1862 and 1789 $cm^{-1}$. Olefin absorptions at 1612 and 1636 $cm^{-1}$ remained and the product had a structure consistent with the formulas

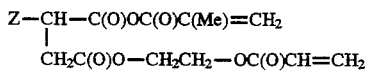

and

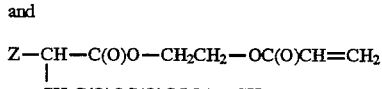

That which is claimed is:

1. A functional polymer which contains at least one acryl group in its molecule, said polymer having a formula selected from the group consisting of

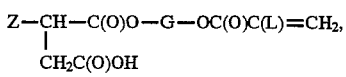

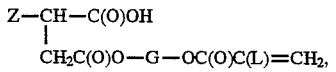

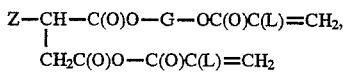

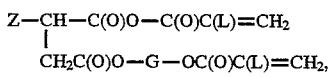

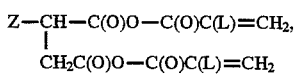

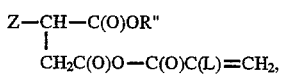

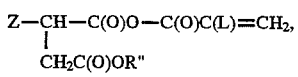

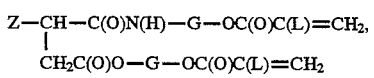

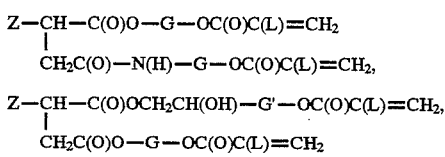

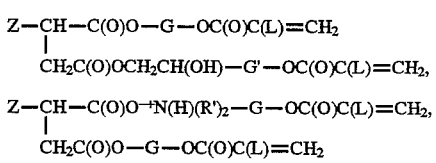

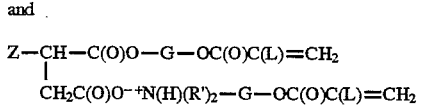

and

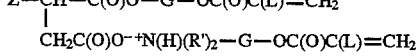

wherein Z represents a polybutylene chain, G is independently selected from alkylene groups having 2 to 10 carbon atoms, G' is independently selected from alkylene groups having 1 to 10 carbon atoms, L is independently selected from the group consisting of hydrogen and an alkyl radical having 1 to 18 carbon atoms, R" is selected from the group consisting of methyl, ethyl and propyl and R' is independently selected from alkyl radicals having 1 to 6 carbon atoms.

2. The functional polymer according to claim 1 having a formula selected from the group consisting of

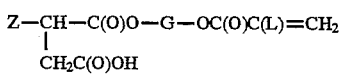

and

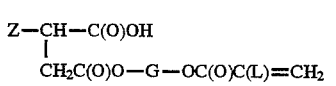

wherein Z represents a polybutylene chain, G is selected from the group consisting of —$CH_2CH_2$—, —$CH_2CH_2CH_2$—, —$CH_2CH(CH_3)CH_2$— and —$CH_2CH_2CH_2CH_2$— and L is selected from the group consisting of hydrogen and methyl radical.

3. The functional polymer according to claim 1 having a formula selected from the group consisting of

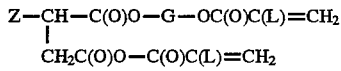

and

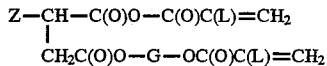

wherein Z represents a polybutylene chain, G is selected from the group consisting of —CH₂CH₂—, —CH₂CH₂CH₂—, —CH₂CH(CH₃)CH₂— and —CH₂CH₂CH₂CH₂— and L is selected from the group consisting of hydrogen and methyl radical.

4. The functional polymer according to claim 1 having the formula

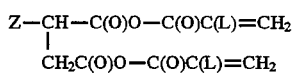

wherein Z represents a polybutylene chain and L is selected from the group consisting of hydrogen and methyl radical.

5. The functional polymer according to claim 1 having a formula selected from the group consisting of

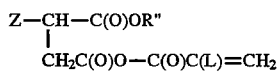

and

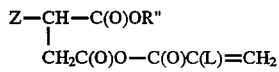

wherein Z represents a polybutylene chain, R" is selected from the group consisting of methyl, ethyl and propyl and L is selected from the group consisting of hydrogen and methyl radical.

6. The functional polymer according to claim 1 having a formula selected from the group consisting of

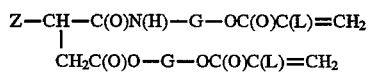

and

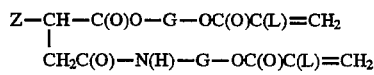

wherein Z represents a polybutylene chain, G is selected from the group consisting of —CH₂CH₂—, —CH₂CH₂CH₂—, —CH₂CH(CH₃)CH₂— and —CH₂CH₂CH₂CH₂— and L is selected from the group consisting of hydrogen and methyl radical.

7. The functional polymer according to claim 1 having a formula selected from the group consisting of

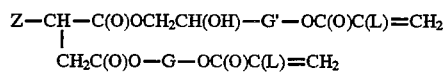

and

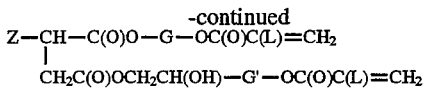

wherein Z represents a polybutylene chain, G' is —CH₂— and L is selected from the group consisting of hydrogen and methyl radical.

8. The functional polymer according to claim 1 having a formula selected from the group consisting of

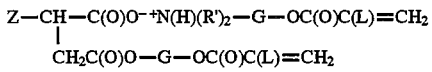

and

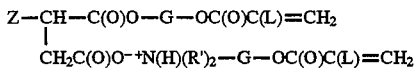

wherein Z represents a polybutylene chain, G is selected from the group consisting of —CH₂CH₂—, —CH₂CH₂CH₂—, —CH₂CH(CH₃)CH₂— and —CH₂CH₂CH₂CH₂—, R' is independently selected from alkyl radicals having 1 to 6 carbon atoms and L is selected from the group consisting of hydrogen and methyl radical.

9. A functionalized polybutylene prepared by reacting
(A) an anhydride-functional polybutylene with
(B) an acryl-functional compound having at least one hydroxyl-containing group in its molecule.

10. The functionalized polybutylene according to claim 9, wherein said anhydride-functional polybutylene has the formula

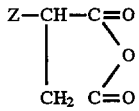

in which Z is a polybutylene chain.

11. The functionalized polybutylene according to claim 10, wherein said acryl-functional compound (B) has the formula HO—G—OC(O)C(L)=CH₂ wherein G is an alkylene group having 2 to 10 carbon atoms and L is selected from the group consisting of hydrogen and an alkyl radical having 1 to 18 carbon atoms.

12. The functionalized polybutylene according to claim 11, wherein G is selected from the group consisting of —CH₂CH₂—, —CH₂CH₂CH₂—, —CH₂CH(CH₃)CH₂— and —CH₂CH₂CH₂CH₂— and L is selected from the group consisting of hydrogen and methyl.

13. A functionalized polybutylene prepared by
(I) reacting
(A) an anhydride-functional polybutylene with
(B) water
to form a dicarboxy-functional polybutylene; and
(II) reacting said dicarboxy-functional polybutylene with
(C) a compound having a formula selected from the group consisting of

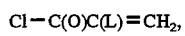

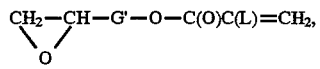

-continued

N(R')$_2$—G—O—C(O)C(L)=CH$_2$,

OCN—G—O—C(O)C(L)=CH$_2$ and

OCN—C(O)C(L)=CH$_2$ wherein L is selected from the group consisting of hydrogen and an alkyl group having 1 to 18 carbon atoms, R' is independently selected from alkyl radicals having 1 to 6 carbon atoms, G is an alkylene group having 2 to 10 carbon atoms and G' is an alkylene group containing 1 to 10 carbon atoms an acryl-functional compound having at least one hydroxyl-containing group in its molecule.

14. The polybutylene according to claim 13, wherein said anhydride-functional polybutylene has the formula

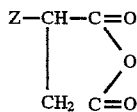

in which Z is a polybutylene chain, G is selected from the group consisting of —CH$_2$CH$_2$—, —CH$_2$CH$_2$CH$_2$—, —CH$_2$CH(CH$_3$)CH$_2$— and —CH$_2$CH$_2$CH$_2$CH$_2$—, G' is —CH$_2$— and L is selected from the group consisting of hydrogen and methyl radical.

15. A functionalized polybutylene prepared by
(I) reacting
(A) an anhydride-functional polybutylene with
(B) an alcohol
to form a half acid, half ester polybutylene intermediate; and
(II) reacting said polybutylene intermediate with
(C) a compound having a formula selected from the group consisting of Cl—C(O)C(L)=CH$_2$,

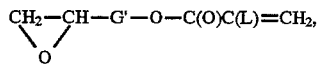

N(R')$_2$—G—O—C(O)C(L)=CH$_2$,

OCN—G—O—C(O)C(L)=CH$_2$ and

OCN—C(O)C(L)=CH$_2$ wherein L is selected from the group consisting of hydrogen and an alkyl group having 1 to 18 carbon atoms, R' is independently selected from alkyl radicals having 1to 6 carbon atoms, G is an alkylene group having 2 to 10 carbon atoms and G' is an alkylene group containing 1 to 10 carbon atoms an acryl-functional compound having at least one hydroxyl-containing group in its molecule.

16. The polybutylene according to claim 15, wherein said anhydride-functional polybutylene has the formula

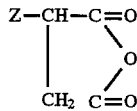

in which Z is a polybutylene chain, G is selected from the group consisting of —CH$_2$CH$_2$—, —CH$_2$CH$_2$CH$_2$—, —CH$_2$CH(CH$_3$)CH$_2$— and —CH$_2$CH$_2$CH$_2$CH$_2$—, G' is —CH$_2$— and L is selected from the group consisting of hydrogen and methyl radical.

17. A functionalized polybutylene prepared by
(I) reacting
(A) an anhydride-functional polybutylene of the formula

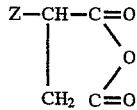

with
(B) an acryl-functional component of the formula

HO-G-OC(O)C(L)=CH$_2$ to form a polybutylene intermediate having a formula selected from the group consisting of

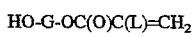
CH$_2$C(O)OH and

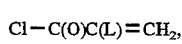
CH$_2$C(O)—G—OC(O)C(L)=CH$_2$ wherein Z is a polybutylene chain, G is an alkylene group having 2 to 10 carbon atoms and L is selected from the group consisting of hydrogen and an alkyl radical having 1 to 18 carbon atoms,
and
(II) reacting said polybutylene intermediate with
(C) a compound having a formula selected from the group consisting of Cl—C(O)C(L)=CH$_2$,

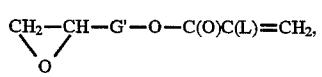

N(R')$_2$—G—O—C(O)C(L)=CH$_2$,

OCN—G—O—C(O)C(L)=CH$_2$ and

OCN—C(O)C(L)=CH$_2$ wherein L is selected from the group consisting of hydrogen and an alkyl group having 1 to 18 carbon atoms, R' is independently selected from alkyl radicals having 1 to 6 carbon atoms, G is an alkylene group having 2 to 10 carbon atoms and G' is an alkylene group containing 1 to 10 carbon atoms an acryl-functional compound having at least one hydroxyl-containing group in its molecule.

18. The polybutylene according to claim 17, wherein G is selected from the group consisting of —CH$_2$CH$_2$—, —CH$_2$CH$_2$CH$_2$—, —CH$_2$CH(CH$_3$)CH$_2$— and —CH$_2$CH$_2$—CH$_2$CH$_2$—, G' is —CH$_2$— and L is selected from the group consisting of hydrogen and methyl radical.

* * * * *